May 30, 1933. J. MAYER Re. 18,852

HAIR WAVING APPLIANCE

Original Filed March 19, 1925

INVENTOR.
Josef Mayer
BY
Hawgood and Van Horn
ATTORNEYS

Reissued May 30, 1933 Re. 18,852

UNITED STATES PATENT OFFICE

JOSEF MAYER, OF KARLSBAD, CZECHOSLOVAKIA, ASSIGNOR TO THE PHILAD COMPANY, OF CLEVELAND, OHIO, A CORPORATION OF OHIO

HAIR WAVING APPLIANCE

Original No. 1,622,957, dated March 29, 1927, Serial No. 16,784, filed March 19, 1925, and in Germany April 9, 1924. Divided and application filed September 14, 1926, Serial No. 135,439. Reissue No. 17,393, dated August 6, 1929, Serial No. 346,174, filed March 11, 1929. Application for reissue filed March 20, 1933, Serial No. 661,862. Divided and this application for reissue filed March 25, 1933. Serial No. 662,784.

This invention relates to the waving of hair upon the human head, and more particularly to the production of lasting waves such as are known as "permanent" waves.

An object of this invention is to provide an improved apparatus for permanent waving which will treat a spiraly wound strand of hair.

Another object is to provide an improved apparatus which will be easily manipulated and efficient in operation.

Another object is to provide an improved apparatus for waving hair by which a wave more nearly simulating naturally wavy or curly hair may be produced.

Other objects will hereinafter appear.

The invention will be better understood from the description of one practical embodiment thereof shown in the accompanying drawing, in which.

Figure 1:
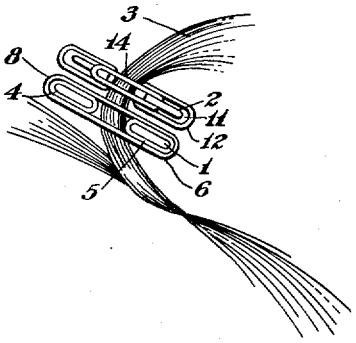
Figure 1 is a fragmentary side elevation of a portion of a person's scalp with one strand of hair engaged by two clamps.

There are at present two styles of permanent hair curling or hair waving in use. In the older or "spindle wind" type of waving, a strand of hair is coiled from its roots helically upon a curling rod, while in the newer or "Croquignole" style of waving, which, as it is applied to the human head, is a development of the present invention, the hair strands are wound from their free ends toward the scalp, turn upon turn, upon a curler. The hair in the older spindle type of waving is bunched together to form a substantially round strand, while in the Croquignole style of waving, in accordance with my present invention, the hair is spread out and held in substantially a single plane to form a flat strand. After winding upon the curler, the hair is in both cases subjected to the action of a suitable heating device to impart permanency to the curl in the case of the first process and to the wave in the second case.

The heating device for the spindle type of permanent curling generally consists of a sleeve-like heating body, adapted to be passed over the curler when wound with hair, and either left open or closed at its ends during the heating process. Such a sleeve-like heating device can, however, not be used in the case of the waving of a flat hair strand, inasmuch as the hair extending between the curler and the head along the length of the curler prevents its application to the curler.

The apparatus which I have provided is shown in the accompanying drawings in which 1 indicates an inner clamp, and 2 an outer clamp. The strand of hair 3 is separated from the remaining hair and then the clamp 1 applied. This holds the strand 3 substantially at right angles to the scalp whereby it may receive further treatment as hereinafter fully described.

The clamp 1 consists of a pair of bars or plates 4 and 5 which may be of fibre, metal or other comparatively stiff material. Each of these bars is covered with a covering of cloth 6 which may be a good grade of flannel. This covering is permanently arranged in place and may be, if desired, saturated with a treating solution. A rubber band 7 is preferably connected permanently to one end of the bars 4 and 5 so as to act as a hinge while a removable rubber band 8 is associated with the opposite end and acts to produce a final clamping action for holding the clamp 1 in place.

The clamp 1 holds the strand 3 properly for further treatment, but in order to further screen the head from the heater in the final treatment, the second clamp 2 is used, which, in addition to screening, acts to clamp the hair 3 tightly so that little or no vapor can pass along the hair to the scalp.

The clamp 2 consists of plates or bars 9 and 10 preferably of metal, each bar being shown as provided with a suitable covering.

Preferably, a permanently positioned asbestos covering 11 is provided for each of the bars 9 and 10, and over this asbestos wrapping is arranged a wrapping 12 of cloth which is preferably a good grade of flannel. These wrappings are left on the plates 9 and 10, though, if desired, they may be slit longitudinally therefrom at any time, in order that the same may be repaired or new ones supplied. In treating the hair, the flannel 12 is preferably saturated with a treating solution.

It will be noted that bar 9 is provided with a notched or stepped end 13 for receiving a link 14 which is pivotally mounted on the bar 10. At the opposite end, a clevis bolt 15 is pivotally mounted on an extension 16 of bar 10 and projects through a suitable aperture in an extension 17 of bar 9. A spring 18 surrounds the shank from the bolt 15 and is put under the proper tension by nut 19 threaded onto the end bolt 15. This arrangement gives a resilient gripping action, and by arranging the link 14 on the desired step 13, the bars 9 and 10 may be kept parallel and maintain the strand 3 flat and under compression throughout its full width. Preferably, the tension on spring 18 is sufficient to cause the bars 9 and 10 to firmly grip the strand 3 and in a certain sense, seal the same against the passage of vapor toward the scalp.

The use of the clamp 2 is important in that it prevents the hot vapors from passing toward the head when the heater is in use.

After the parts have been arranged as described, the outer end of the strand 3 is placed beneath the tongue or gripping strip 20 pivotally mounted at 20′ on a curling rod or tube 21 which is of less diameter at the center than at the ends, and which tapers from the ends toward the center. After the strand of hair 3 has been clamped by tongue 20, the curler 21 is rotated until the hair is rolled on the curler to substantially the position shown in Figure 2. A wrapping 22 of flannel is then applied and with it a solution of any desired kind as for instance a mixture of water, bi-carbonate of soda and carbonate of magnesia, and over this wrapping a second wrapping 23 of waxed paper is applied, the waxed paper being longer than the curler 21, so that the ends may be twisted for completely enclosing the hair.

The waxed paper with its various coverings acts to hold the vapor within the rolled hair and thereby act thereon so that the hair will be given a substantially permanent curvature or wave.

Figure 2:
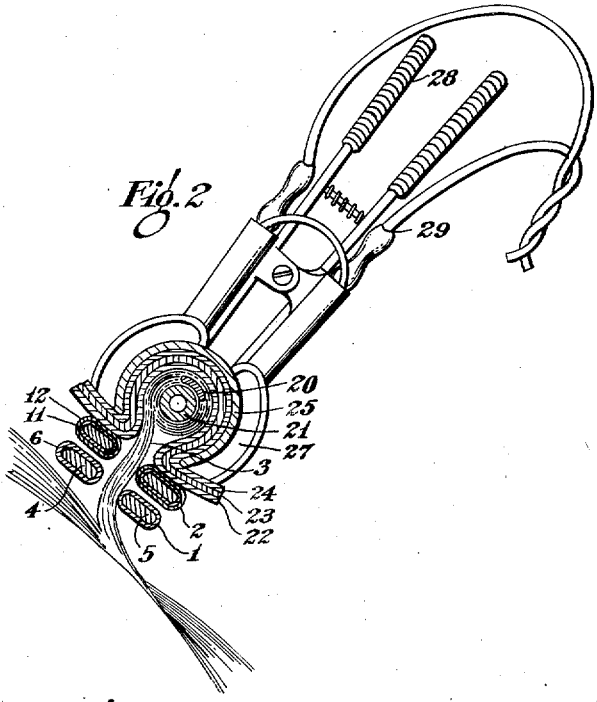
Figure 2 is a similar view showing the strands wound upon a curling rod and covered with covering material and an electric heater, parts being shown in cross-section.
Figure 3:
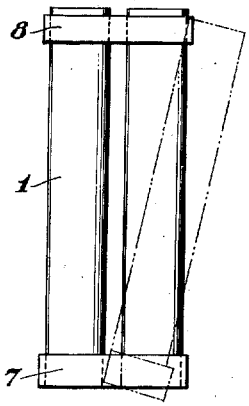
Figure 3 is a plan view of one of the clamps illustrated above.
Figure 4:
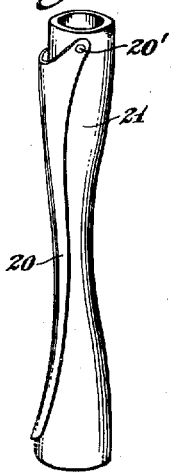
Figure 4 is a perspective view of the curler rod or tube.
Figure 5:
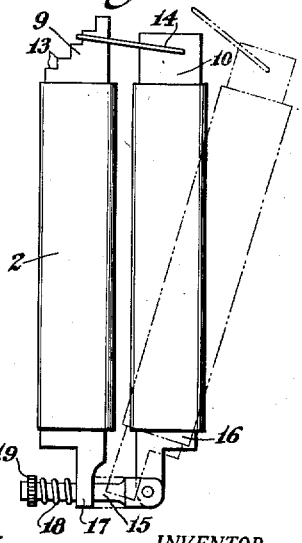
Figure 5 is a view similar to Figure 3 but showing the other clamp used.
Figure 6:
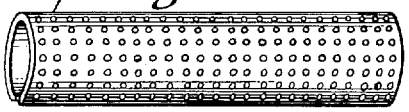
Figure 6 is a perspective view of a perforated metal holder.

In order to reenforce and protect the waxed paper, a covering 24 of parchment is applied over the paper and finally a metallic clamping member 25 is applied over the parchment as shown in Figure 2. The member 25 is perforated and is resilient so that it can be readily sprung into position and will somewhat grip the roll of hair.

A heater is next applied substantially in the position indicated in Figure 2. This heater is of the type shown in my Reissue Patent No. 17,585 and extends for the full length of the curler rod. It consists of two arcuate shells 26 and 27 which contain electrical heating elements (not shown), the shells being provided with pivoted handles 28 urged apart by a spring 29 which causes the shells to grip the wrapped coil of hair. The electric current is then turned on and the hair subjected to heat and the moisture of the above mentioned solution to produce the permanent wave desired.

After the heat has been applied for the desired time, the heater is removed and the various parts shown in Figure 2 are removed. The hair is preferably then combed out straight and finally allowed to fall into waves.

While I have described the above embodiment of my invention in some particularity, it is obvious that many other embodiments will readily occur to those skilled in this art, and I do not, therefore, limit myself to the specific details shown and described, but claim as my invention all embodiments thereof falling within the scope of the appended claims.

What is claimed is:

1. A permanent hair waving apparatus comprising a pair of superimposed clamps for clamping a strand of hair near the base, means for winding the hair so that the axis of the wound hair will be substantially parallel with that part of the head from which the air extends, waxed covering means for covering the wound hair, and a flexible metallic retainer arranged over said covering means, said holder being adapted to receive a heater for heating the hair while wound.

2. In a permanent hair waving apparatus, a pair of flat bars for gripping a flat strand of hair, heat resisting means covering each of said bars, a liquid absorbing member covering said heat resisting means, a resilient hinge connecting said bars together adjacent one end, one of said bars being formed on the end opposite said hinge with a stepped formation and an adjustable link carried by the other of said bars and adapted to fit against said stepped formation for connecting the opposite ends of said bars together.

3. A hair engaging clamp comprising two straight flat heat insulated bars connected together at one end by a pivot normal to their broad surfaces, and a latch detachably and adjustably connecting the other ends of said bars.

4. A hair treating apparatus comprising a clamp having two elongated heat insulated bars pivotally connected together at one end and detachably connected at the other end, two heat insulating bars of substantially the same configuration as that of the said first two bars and arranged to be positioned between the first two mentioned bars and the scalp.

5. A hair treating apparatus comprising a clamp having two elongated heat insulated bars pivotally connected together at one end and detachably connected at the other end, two heat insulating bars of substantially the same configuration as the said first two bars and arranged to be positioned between the first two mentioned bars and the scalp, and resilient means exerting pressure on the hair gripped between said bars.

6. A hair treating apparatus comprising a clamp having two elongated heat insulated bars pivotally connected together at one end and detachably connected at the other end, two heat insulating bars of substantially the same configuration as the said first two bars and arranged to be positioned between the first two mentioned bars and the scalp, and a curler rod of substantially the same length as said bars adapted to receive the wound hair and be maintained by said bars away from the scalp of the wearer.

7. A clamp for retaining a flat strand of hair adjacent the scalp which comprises two elongated bars, means for clamping the bars together about the strand in substantially parallel arrangement, insulation interposed between the bars and the scalp to prevent the transfer of heat therebetween, and resilient means pressing the bars upon the strand of hair.

8. A clamp for retaining a flat strand of hair adjacent the scalp which comprises two elongated bars, means for clamping the bars together about the strand in substantially parallel arrangement, insulation interposed between the bars and the scalp to prevent transfer of heat therebetween, and adjustable resilient means pressing the bars upon the strand of hair.

In testimony whereof, I hereunto affix my signature, this 28th day of February, A. D. 1933.

JOSEF MAYER.